United States Patent [19]

Jones et al.

[11] Patent Number: 4,505,126
[45] Date of Patent: Mar. 19, 1985

[54] FOOD PRODUCT TRANSPORT SYSTEM

[75] Inventors: Robert Jones, Sunset Harbor; Hubert R. Thompson, Belleview, both of Fla.

[73] Assignee: Certified Grocers of Florida, Inc., Ocala, Fla.

[21] Appl. No.: 617,717

[22] Filed: Jun. 6, 1984

[51] Int. Cl.³ ............................................. B60H 3/04
[52] U.S. Cl. ...................................... 62/239; 62/329; 62/441; 280/43.22; 280/43.24; 296/24 R; 410/66
[58] Field of Search ................ 62/239, 441, 447, 329; 296/24 R; 410/66; 280/43.22, 43.24

[56] References Cited

U.S. PATENT DOCUMENTS

| | | | |
|---|---|---|---|
| 2,633,714 | 4/1953 | Wehby | 62/239 X |
| 2,677,244 | 5/1954 | Wehby | 62/239 X |
| 2,820,560 | 1/1958 | Davis | 296/24 R X |
| 2,984,084 | 5/1961 | Talmey et al. | 62/239 |
| 3,057,284 | 10/1962 | Learmont | 62/239 X |
| 3,287,925 | 11/1966 | Kane et al. | 62/239 X |
| 4,056,066 | 11/1977 | Homanick | 410/66 |
| 4,108,455 | 8/1978 | James | 280/43.24 X |
| 4,468,060 | 8/1984 | Fitzgerald et al. | 62/239 X |
| 4,469,364 | 9/1984 | Rafi-Zadeh | 296/24 R X |
| 4,470,228 | 9/1984 | Dirck | 296/24 R X |

Primary Examiner—William E. Tapolcai
Attorney, Agent, or Firm—R. L. Martin

[57] ABSTRACT

A transport system for food products contemplates a land vehicle with a van body and a refrigeration unit and a food product carrier which may be inserted and withdrawn from the interior of the van body. The carrier has a plurality of compartments for housing the refrigerated food products and when the carrier is in its operative position in the van body, it is arranged to cooperated with the refrigeration unit so that the unit serves to refrigerate the food products in one of the end compartments of the carrier. Between the compartments, the carrier is provided with movable panels that are equipped with motorized fans for circulating air between adjacent compartments. This circulates air between the compartments and the arrangement is such the temperature range maintained in each compartment rises from one compartment to the next. Each compartment is accessible from the exterior of the van body and through aligned doorways in the adjacent side walls of the van body and carrier. These doorways in the carrier are panel type, track mounted doors whereas those in the van body may be hinged for pivotal movement about a vertical axis. Non-refrigerated food products are stored in a compartment located in the van body and between the rear wall of the van body and the carrier as it is located in its operative position therein.

11 Claims, 13 Drawing Figures

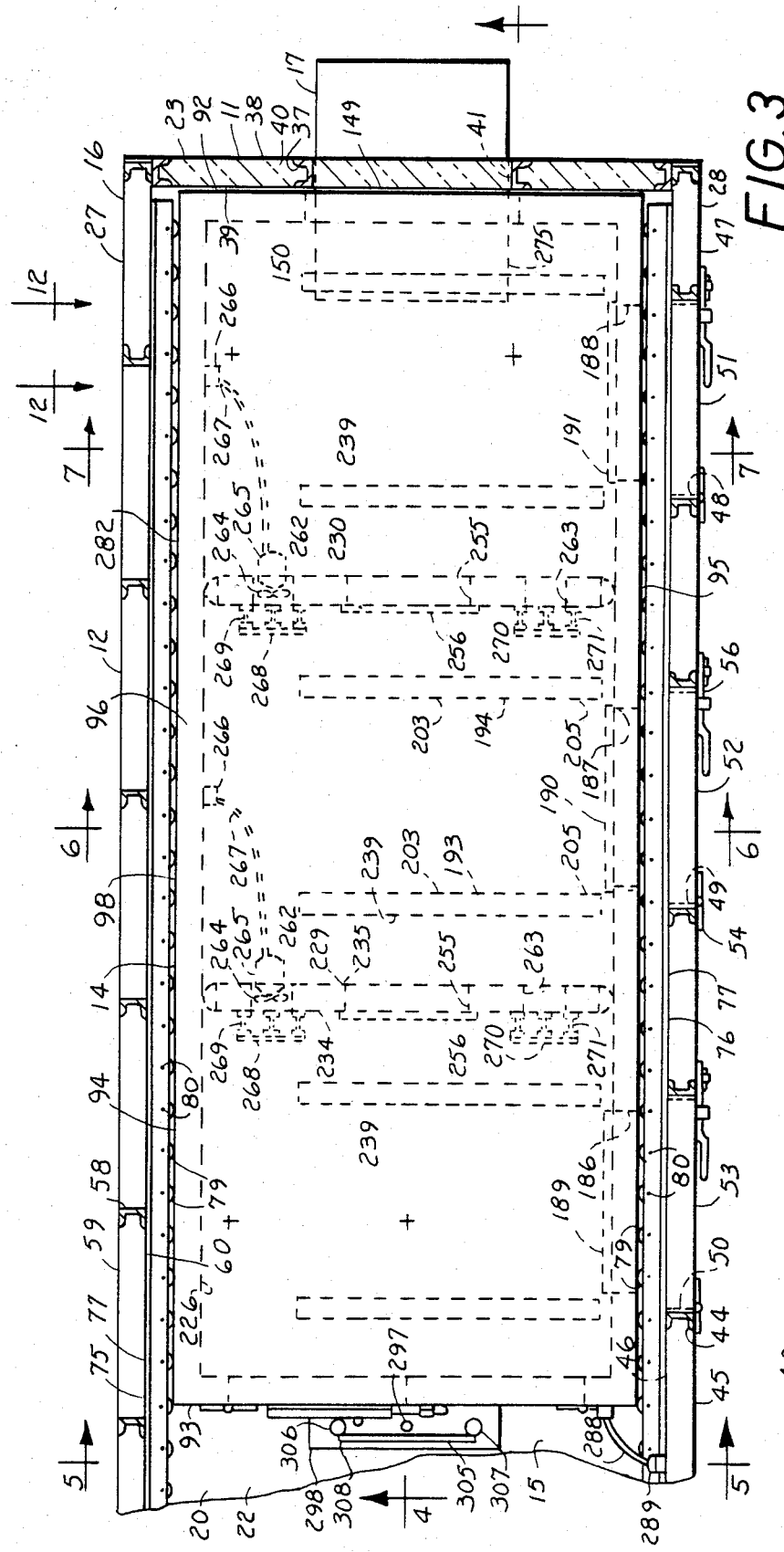
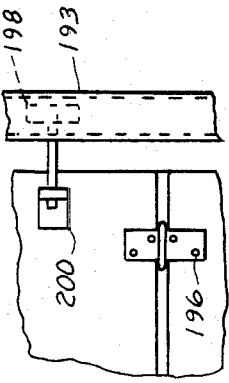
FIG.3
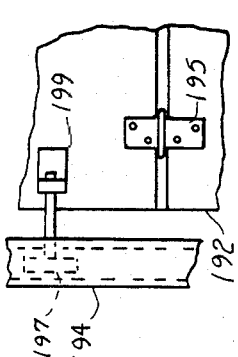
FIG.13
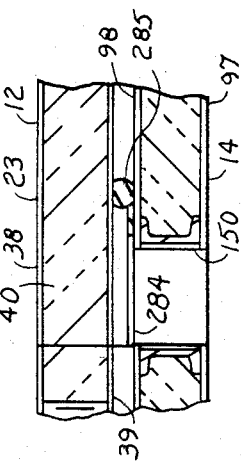
FIG.8

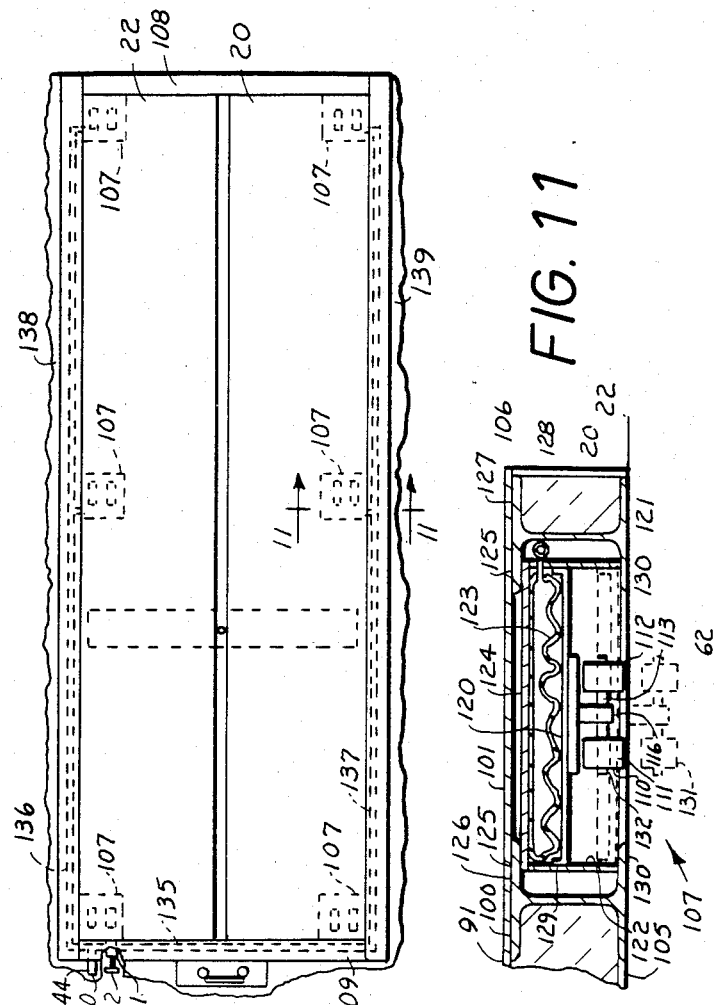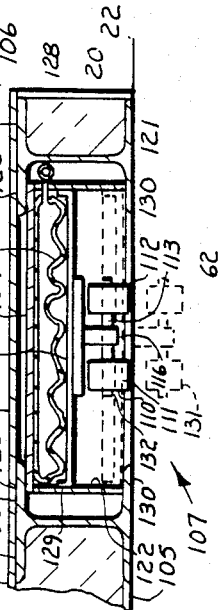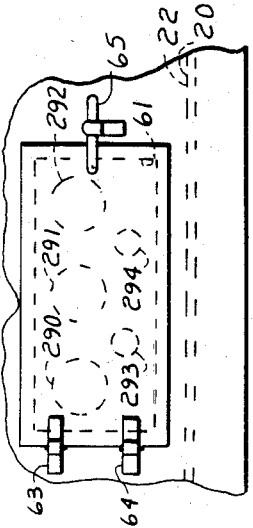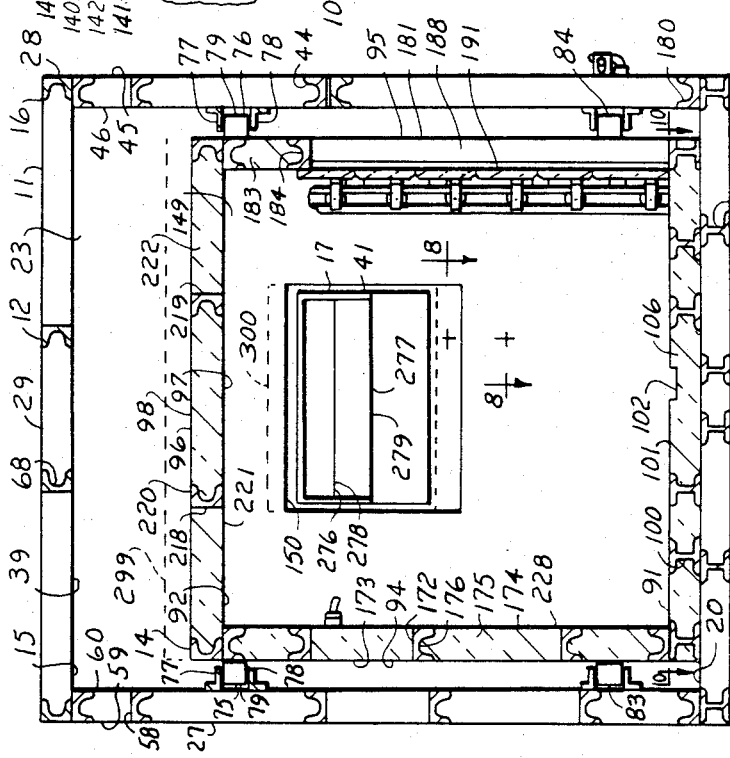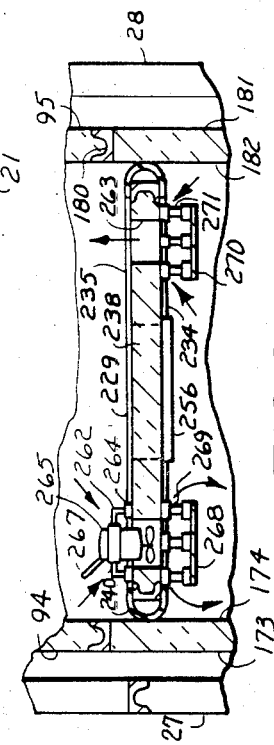

FOOD PRODUCT TRANSPORT SYSTEM

The invention relates to a food product transport system and more particularly to one that involves the use of a land vehicle with a van body and refrigeration unit and a cargo carrier that fits in the van body and has a plurality of compartments which are refrigerated through use of the refrigeration unit.

BACKGROUND OF THE INVENTION

Food products which are distributed to normal retail outlets generally fall into the following categories:

Category 1—Those refrigerated food products which are perishable and normally frozen, e.g., prepared frozen food products, ice creams, frozen juice concentrates, some meats, etc.

Category 2—Those refrigerated food products which are perishable and normally maintained above but nevertheless near freezing temperatures (usually in the 32°–45° F. range), e.g., whole and pasteurized milks, butter, some prepared meats, etc.

Category 3—Those refrigerated food products which are perishable and normally maintained at sub-ambient temperatures (usually in the 45°–55° F. range), sometimes to suppress dehydration, e.g., fresh produce, such as lettuce, cabbage, celery, etc., some prepared meats, dairy products, some canned goods, etc.

Category 4—Those food products which need not be refrigerated and can normally tolerate ambient temperature conditions for at least short periods of time, e.g., many canned goods, soft drinks, most bakery products, etc.

There is no problem distributing such food products to large retail outlets that are capable of receiving and handling truck load quantities. In such cases, a suitable transportation vehicle is selected for the food product category to be transported to the retail outlet. Those food products which are frozen or refrigerated are normally transported on vehicles that are suitably equipped with an insulated van body and an appropriate refrigeration unit. Those food products which can tolerate ambient temperatures, however, are usually transported in uninsulated and nonrefrigerated transportation equipment.

The distribution of such food products to small retail outlets which handle all four food product categories but which are unable to economically receive and handle the large truck load quantities, creates a distribution problem for the large distributor and which ultimately leads to higher costs to the small retailer. For one, it is more or less impossible to transport all four categories of food products in the same van body since the temperature requirements for each category is different. In practice, this is partially overcome by various procedures. In many cases, insulated and mobile food lockers are used for housing the frozen food products in the van body. In such cases, the low temperatures are maintained through the use of dry ice (solid carbon dioxide) in the lockers. Fresh produce, on the other hand, is usually iced down in their shipping cartons with conventional ice (frozen water) and many of the remaining food products in the refrigerated categories are simply omitted from the shipments and left for purchase by the small retailer at the higher prices often charged by local suppliers.

The above practices have many disadvantages. They almost make it mandatory that a vehicle with an expensively insulated van body be used even though some of the food products being transported do not require refrigeration. Furthermore, the mixing of iced down produce and boxed food products in the same compartment often leads to water absorption by the cardboard containers for reasons of inadequate drainage of the water derived from the melting ice. Furthermore, the mixing of the various food product categories in the van body lends to inefficient use of the interior space if easy access to each category is to be realized through use of the conventional van body structures currently being used in the distribution of such food products to the retailers.

As will be seen, the invention relates to a food product transport system which involves a land vehicle with a van body, an insulated and mobile cargo carrier for containing the food products that require sub-ambient temperature conditions, and which, during transportation of the food products, is securely located in the van body. The system also contemplates a refrigeration unit that is mounted on the land vehicle and used in maintaining the sub-ambient temperature conditions within the mobile cargo carrier.

Insulated cargo carriers for use in transporting perishable food products under controlled temperature conditions from one location to another on over land and/or over sea vehicles are known. They range in size from relatively small food lockers which are equipped with wheels that facilitate their movement about a work area without the need for auxiliary lifting equipment to relatively large cargo containers that require auxiliary lifting equipment for their translocation in and about a work area.

The desire in using such carriers is to control the temperature in the food product carrier at a sub-ambient temperature such as to avoid spoilage of the contained food product during transit. As such, various different methods of conditioning the air in the carriers during transportation have evolved.

To attain and maintain sub-ambient temperatures, the carrier is equipped, in some cases, with an electrically powered refrigeration system which connects with the electrical power supply of the vehicle. (See Cantagalloet et al., U.S. Pat. Nos. 3,699,870 and 3,733,849.) Such systems take up valuable space in the structure forming the carrier and dissipate the heat extracted from within the container to the atmosphere externally thereof. This precludes the transporation of such containers within a closed van body structure of an over land vehicle because the heat, thus dissipated, accumulates within the van body and causes extreme temperature rises which result in refrigeration equipment overloads and damages. As such, large carriers which are thus equipped with their own refrigeration systems are mainly transported on so-called "flat bed" types of land vehicles.

To arrive at or maintain the sub-ambient temperature conditions in the cargo carriers in other cases, the carriers have been equipped with internal evaporator coils in which a refrigerant that is supplied from an external source is evaporated to extract the internal heat. (See Tetrick et al., U.S. Pat. Nos. 3,507,322 and 3,468,369; and McSheehy et al., U.S. Pat. No. 3,898,854.) Although such carriers are mainly adapted for connection with the refrigerant supplying components of a refrigeration system at fixed land locations, it has been advocated to equip vehicles with the necessary refrigeration supply components. In such cases, the evaporator coils of the carriers are connected to the refrigerant supply components on the vehicle at the time the carriers are loaded and are thereafter disconnected from the system at the time of unloading. The main problem with this type carrier arrangements is that it requires the mounting on the vehicle of a partial refrigeration system which is only useful when the evaporator coil equipped cargo carriers are being transported thereby. This type of system is primarily limited to use with small lockers or containers because the large confined areas involved in large carriers require the use of fans in attaining satisfactory movement of air with respect to the evaporation coils.

Another type of perishable food carrier is that which relies on the insertion of a cryogenic fluid such as liquid nitrogen into the carrier and wherein it is evaporated to extract the heat. (See Hill et al., U.S. Pat. No. 3,557,569.) Such carriers are merely adapted to receive the cryogenic material internally from an external resource which may be provided in the form of a suitable tank of the cryogenic material that is conveniently mounted on the individual container per se or on the vehicle.

Still another type of perishable food carrier is that which is adapted for coupling with the inlet and outlet of the fan used for circulating the air over the evaporation coils of a refrigeration system. (See Westling et al., U.S. Pat. No. 3,359,752.) This type of container has the advantage that conventional refrigeration systems in commercial use on over land vehicles may be used for controlling the temperature in the containers at the desired sub-ambient levels.

SUMMARY OF THE INVENTION

The invention relates to a food product transport system which involves a land vehicle with a van body and a refrigeration unit, and a mobile cargo carrier that is equipped to carry the refrigerated food product category in the interior of the van body and is maintained at the necessary sub-ambient temperature conditions by means of the refrigeration unit. The van body has a plurality of entranceways or lateral openings that are horizontally spaced apart in one side wall, and the cargo carrier has a plurality of doorways or lateral openings that are horizontally spaced apart in a side wall that is located proximate to the side wall with the entranceways when the cargo carrier is secured in the van body so that its front wall is in close proximity to the front wall of the van body. By means of upright panels, the interior of the cargo carrier is divided into a plurality of compartments. Each compartment is associated with one of the side wall doorways and which provides an accessway between the compartment and the exterior of the carrier. When the cargo carrier is secured in the van body of the transport system, each doorway is aligned with one of the side wall entranceways to the van body so that access to each compartment of the carrier from the exterior of the van body may be gained through the side wall entranceway that is aligned with the side wall doorway associated therewith.

In accord with certain aspects of the invention, the refrigeration unit has a system for passing air in heat interchange with the coolant, such as the refrigerant, and the system includes an air intake and discharge conduits which pass through the front wall of the van body and also through the front wall of the carrier when the carrier is secured in its operating position in the van body. This arrangement is such that the refrigeration unit is able to maintain sub-freezing temperatures in the front end compartment. The compartments are spaced apart in accord with certain aspects of the invention by upright panels that extend transversely of the carrier. Each panel is equipped with a system for circulating air between the compartments at the opposite side faces of the panel. This system includes a fan for withdrawing air from the compartment at the front side of the panel and for discharging it into the compartment at the rear side face plus an opening for the return of air from the compartment at the rear side of the panel to the compartment at the front side of the panel. Other aspects of the invention, contemplate panels that are movable in the interior of the carrier and these as well as other aspects will be apparent from the following description.

One object of the invention is to provide an economical land transport system for perishable food products that fall into more than one of the aforementioned refrigerated food product categories. Yet another object is to provide an economical land transport system for perishable food products that fall into more than one of the refrigerated food product categories heretofore mentioned and which avoids the need for using a vehicle with a costly and totally insulated van body. Yet another object is to provide a land transport system for perishable food products that fall into more than one of the aforementioned refrigerated food product categories and which permits the use of a refrigeration unit that is conventionally used for refrigerating food products that are carried in conventional insulated van body structures and without the need for using such insulated structures. Still another object of the invention is to provide a transport system for perishable food products that fall into more than one of the aforementioned refrigerated food product categories and which utilizes an insulated mobile cargo carrier for containing the perishable food products and relies on a refrigeration unit that is permanently mounted on a land vehicle used in carrying the carrier from one place to another as the means for maintaining the sub-ambient temperature requirements for the food products in the refrigerated categories. Yet another object is to provide a land transport system for food products that fall into a plurality of refrigerated food product categories and which is especially economical and useful for delivering such refrigerated food products to small retail outlets, as well as for delivering non-refrigerated food products to such small retail outlets. Still another object is to provide a transport system for perishable food products that fall into a plurality of the refrigerated food product categories heretofore mentioned and which permits the use of van body equipped land vehicles and a reduction in the amount of time required to both load and unload the perishable food products.

BRIEF DESCRIPTION OF THE DRAWINGS

The novel features which are believed to be characteristic of this invention are set forth with particularity in the appended claims. The invention, itself, however, both as to its organization and method of operation, together with further objects and advantages thereof, may best be understood by reference to the following descriptions taken in connection with the accompanying drawings, wherein:

FIG. 3 is a horizontal sectional view through the van body fragment seen in FIG. 2 and as taken generally along the Lines 3—3 thereof, certain inside structure of the cargo container of carrier being generally depicted in broken lines;

FIG. 7 is a generally transverse vertical section through the van body and cargo carrier as taken generally along the Lines 7—7 of FIG. 3, certain parts being removed and/or broken away;

FIG. 8 is a generally horizontal section through the front end walls of the van body and cargo carrier as taken generally along the Lines 8—8 of FIG. 7;

FIG. 9 is a horizontal section through a movable panel component of the cargo carrier and adjacent side walls of the carrier and van body as generally seen along the Lines 9—9 of FIG. 6, certain parts being removed;

FIG. 10 is a horizontal plan view of the cargo carrier as generally seen along the Lines 10—10 of FIG. 7, the view being on a reduced scale to illustrate a fluid drain system in the floor of the carrier and certain wheel assemblies, the latter being shown in broken lines;

FIG. 11 is a vertical section through one of the wheel assemblies illustrated in FIG. 10, the section being on an enlarged scale and taken generally along the Lines 11—11 of FIG. 10;

FIG. 12 is an enlarged elevational view of a fragment of the van body as seen generally at the left side of the trailer and along the Lines 12—12 of FIG. 3, certain lights and temperature gauges mounted on a panel of the cargo carrier being seen in broken lines; and FIG. 13 is a fragment of one of the cargo carrier doors and adjacent structure as generally enlarged and seen along the Lines 13—13 in FIG. 6.

DETAILED DESCRIPTION OF INVENTION

Figure 1:
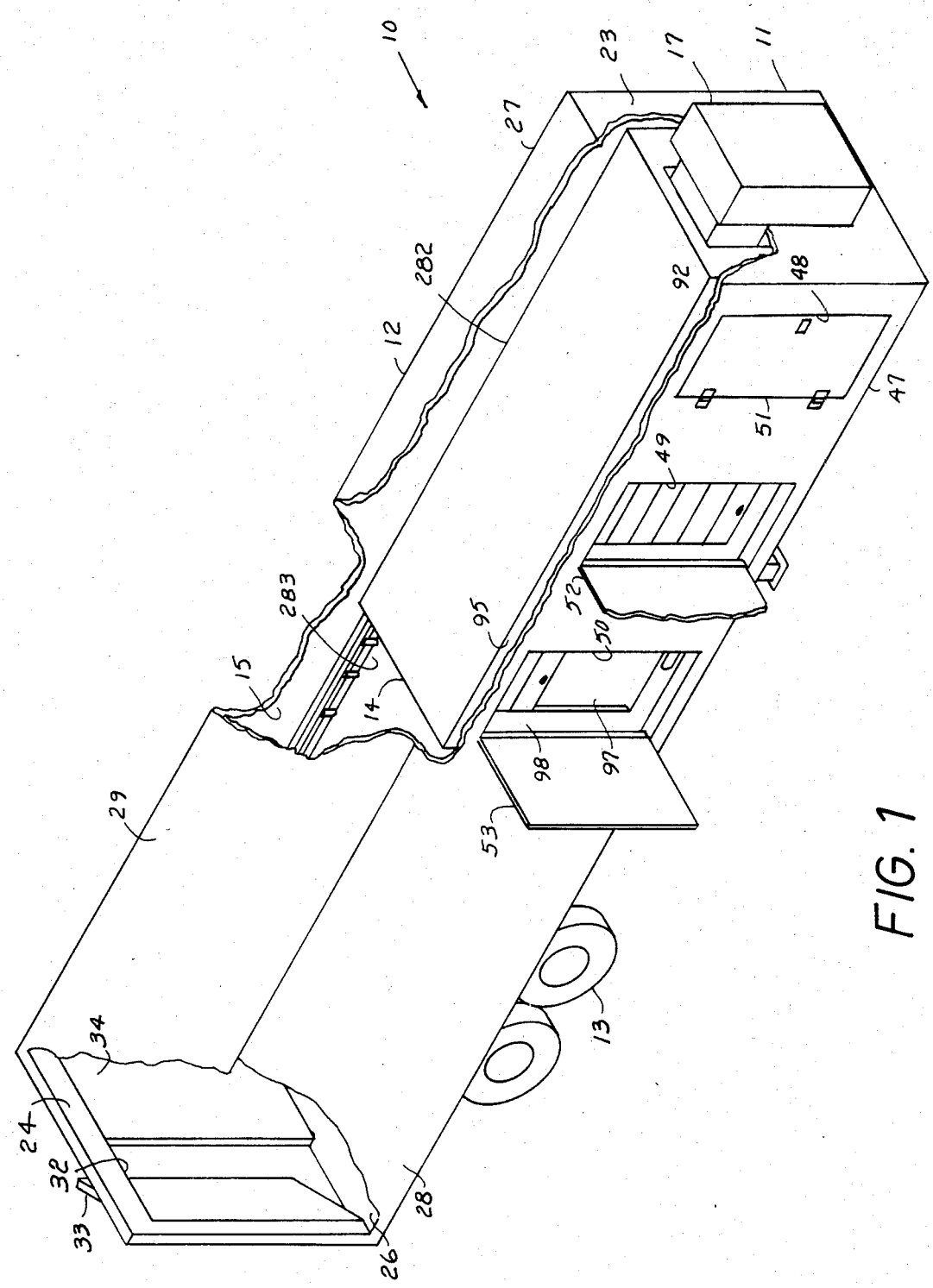
FIG. 1 is an isometric view of an embodiment of the invention and which shows a highway trailer that is equipped with a van body and a refrigeration unit, certain parts being removed and others broken away to expose an internally located cargo carrier for certain food products that are refrigerated by means of the unit.

The food product transport system in accord with the invention contemplates a land vehicle that is equipped with a van body and a refrigeration unit that is permanently mounted thereon. The system also contemplates a mobile cargo carrier which is adapted for insertion into and withdrawal from the interior of the van body and provided with a plurality of compartments for containing refrigerated food products.

Reference is now made to the drawings and wherein a food product transport system embodying the invention is designated at 10. (FIG. 1) It includes a land vehicle 11 with a van body 12 that is mounted on a road wheel assembly 13. It also includes a compartmented and mobile cargo carrier 14 that is located in the interior 15 of the van body for containing refrigerated food products, and a refrigeration unit 17 that is mounted on the vehicle 11 and provides a means for refrigerating the food products which are located in the cargo carrier 14.

The land vehicle 11 is illustrated in the drawings in the form of a highway trailer which is equipped with a van body to be described hereinafter and which is drawn by a conventional self-propelled tractor (not shown). It will be apparent however that other types of land vehicles may be utilized so long as they are adequately equipped with a suitable van body and refrigeration unit as contemplated hereinafter.

The van body 12 shown in the drawings is generally elongated and includes a rectangular floor 20 with a floor frame 21 that is covered by an interior floor plate 22. It has opposite end walls 23 and 24 that extend transversely of the van body and are spaced apart and mounted upright at the opposite ends 25 and 26 of the floor 20. It also includes opposite side walls 27 and 28 that are mounted upright and extend longitudinally of the van body between the opposite ends 25 and 26 of the floor 20 and between the front and rear end walls 23 and 24 thereat. The horizontal roof 29 overlies the interior 15 of the van body and is mounted on the upright side and end walls mentioned above.

The rear end wall 24 (FIG. 1) of the van body 12 has a large rectangular entranceway 32 to the interior 15 and which serves as an accessway for the passage of the cargo carrier 14 into and out of the interior during the loading and unloading of the van body. This entranceway 32 is closed during transportation of the food products by means of a pair of doors that are hinged to the rear wall 24 for outward swinging movement during the process of opening the entranceway 32 for access to the interior 15 at the rear end of the vehicle.

The front end wall 23 includes a wall frame 37, an exterior side covering 38 and an interior side covering 39. Insulation 40 is provided between the structural members of the wall frame 37 and between the coverings 38 and 39 for reasons which will be evident subsequently. This wall 23 has a rectangular opening 41 that extends between the interior 15 and exterior 16 of the van body and the air intake and discharge conduits of a refrigeration unit that is mounted at the exterior of the van body extend through and are sealed in the opening 41 for purposes which will be evident subsequently.

Figure 2:
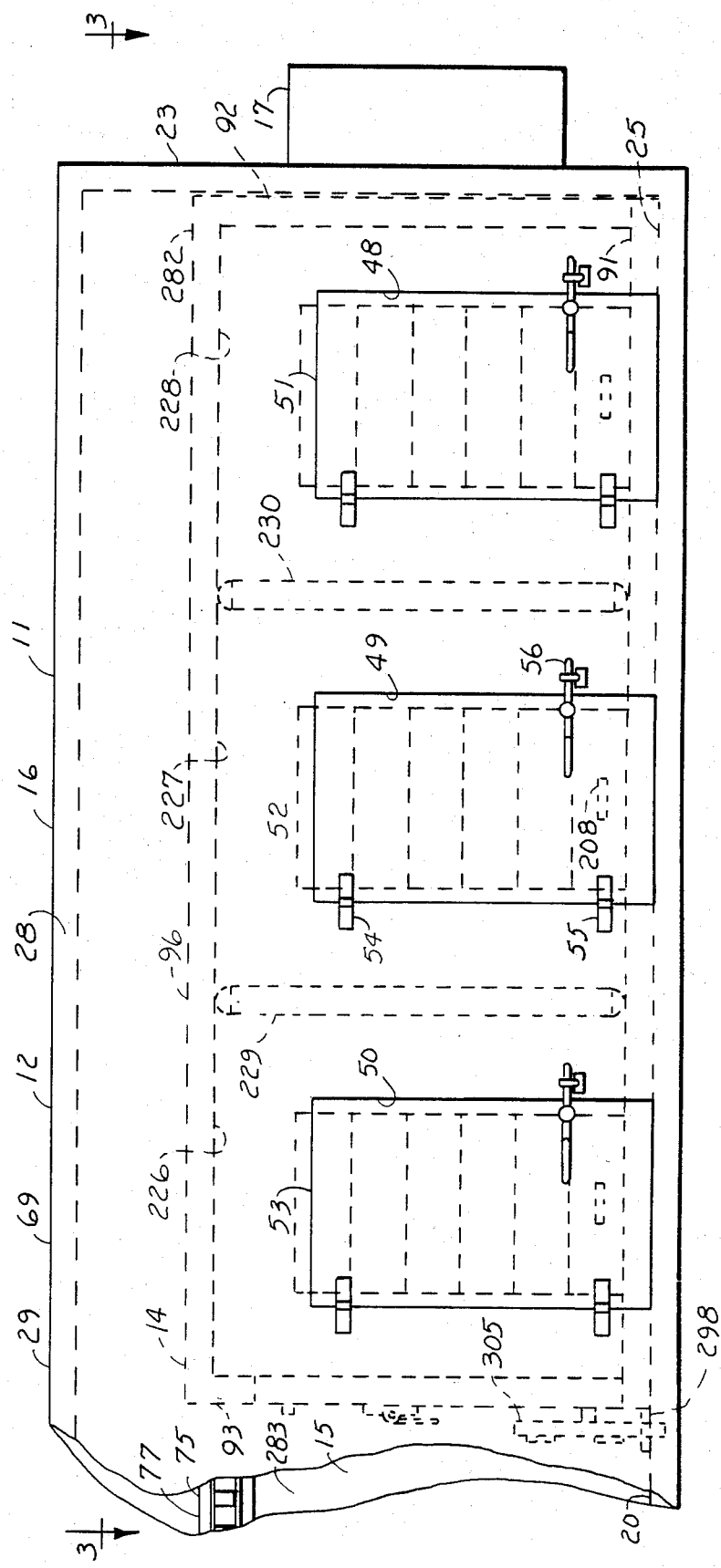
FIG. 2 is an elevational view of the van body portion of the trailer seen in FIG. 1 and as viewed at the front right side thereof, certain parts being removed and other broken away, and the cargo container within the van body in certain components thereof being depicted in broken lines.

The right side wall 28 of van body 12 includes a wall frame 44 that is covered at the exterior side of the body 12 by a metal covering 45 and at the interior side by a suitable covering 46. The front part 47 of side wall 28 is provided with a plurality of lateral openings which serve as entranceways 48, 49 and 50 to the interior 15 of the van body 12 and which are longitudinally spaced apart in the wall structure as seen in FIGS. 1 and 2. A plurality of doors 51, 52 and 53 are provided as a means for closing the respective entranceways 48, 49 and 50. Each door is hinged for outward pivotal movement by a pair of hinges, such as the pair of hinges designated at 54 and 55 for the center door 52 that is seen in its closed position with respect to the center entranceway in FIG. 2. Each door is provided with a releasable latch device, such as the latch device 56 used for retaining the center door 52 in its closed position.

The left side wall 27 includes a wall frame 58 that is provided with an exterior side covering 59 and an interior side covering 60. Adjacent the front end wall 23 and in the proximity of the floor plate 22, the left side wall 27 is provided with a rectangular wall opening 61 (FIG. 12). This opening is covered by a small door 62 which is hinged to the side wall 27 by a pair of hinges 63 and 64. The door is normally latched in the closed position by a latch device designated at 65. Wall opening 61 provides a port for viewing from the exterior of the van body, certain temperature gauges that are mounted on the cargo carrier when the cargo carrier is located in the van body 12 as will be subsequently seen.

The roof 29 of the van body 12 includes a rectangular frame 68 with an exterior covering 69 and an interior covering 70. It rests on the side and end walls of the van body 12 and, of course, is rigidly connected thereto in the formation of the van body structure.

In its interior 15, the van body 12 is equipped with a pair of elongated roller assemblies 75 and 76. These are mounted on the opposite side walls 27 and 28 and are provided for guiding wheeled movement of the cargo carrier into and out of the interior of the van body. The assemblies 75 and 76 extend longitudinally of the carrier substantially throughout the length of the van body and are generally located in a horizontal plane above the side wall entranceways to the interior of the van body as seen in FIG. 2. Each of the assemblies 75 and 76 includes a pair of elongated, horizontally arranged, and vertically spaced angle members 77 and 78 that are fixed to the opposite side walls 27 and 28. Each assembly also has a plurality of rollers 79 that are mounted for rotational movement between the members 77 and 78 on horizontally spaced apart and vertically extending pins 80 which establish vertical axes for rotational movements thereof. As thus mounted, the arrangements are such that the rollers 79 of the respective assemblies 75 and 76 normally contact the opposite side walls of the cargo carrier 14 during movement into and out of the van body as will be subsequently seen.

Near the floor 20 and adjacent to the front end wall 23, the van body 12 is equipped with a pair of rollers 83 and 84. These rollers are mounted on the opposite side walls 27 and 28 and in the interior 15 of the van body. Each roller is mounted for rotation about a vertical axis that is established by a pin 85 which is mounted on and extends between a pair of angle members 86 and 87. These angle members 86 and 87 are vertically spaced apart and are fixed to the adjacent side walls as is evident from the drawings. As thus mounted at the front end 25 of the van body floor 20, these rollers 83 and 84 serve as a means for guiding wheeled movement of the carrier 14 at the front end of the van body and for securing the carrier 14 against substantial lateral movement relative to the van body when the carrier assumes its operative position therein as will be subsequently seen.

The cargo carrier 14 is an elongated compartmented structure that is shaped and arranged for insertion and withdrawal from the interior 15 of the van body 12 through the entranceway 32 in the rear wall thereof. It includes a generally rectangular floor 91 and a pair of upright opposite end walls 92 and 93 that are longitudinally spaced apart and extend transversely in the carrier structure. It also includes a pair of opposite side walls 94 and 95 that are transversely spaced apart in the carrier structure and extend longitudinally between the opposite end walls 92 and 93. In addition, the carrier has a generally rectangular roof 96 that rests and is fixed on the upright side and end walls in an arrangement such that it overlies the interior 97 of the carrier 14.

The floor 91 includes a rectangular floor frame 100 which is covered at the interior side of the carrier by a floor plate 101. Plate 101 has an elongated U-shaped recess 102 (FIG. 10) that is located intermediate the opposite side walls 94 and 95 and extends between the opposite end walls 92 and 93. The recess 102 inclines from its opposite ends toward an opening 103 which communicates with a rectangular tank 104 that is mounted below the floor plate 101 in frame 100. As will be seen, recess 102 provides a passage to the drain opening 103 to tank 104 for waste fluids that drip or otherwise fall on the floor of the carrier during the handling of the food products therein. Tank 104 serves as a means for containing the waste fluids until they may be disposed of at an appropriate disposal area. The tank 104 is provided with a suitably valved discharge conduit and appropriate coupling for connecting the tank with the discharge hose at the point of disposal.

At the bottom of the floor frame 100, the carrier 14 has a metal covering 105 which extends between the webs of the floor beams except in those areas where the wheel assemblies are located and between the floor plate 101 and the exterior covering 105, the floor is insulated with insulation material 106 to minimize the loss of heat through the floor structure.

To facilitate movement of the cargo carrier into and out of the van body 12, the floor frame 100 is provided with a plurality of wheel assemblies 107. These assemblies 107 are vertically movable relative to the floor frame 100 between extended positions 131 (FIG. 11) below the floor frame 100 and at which the floor frame of the carrier is supported spacedly above the supporting surface and retracted positions 132 at which the carrier floor frame 100 is in contact with and rests on the support surface. These wheel assemblies 107 are substantially similar except that the assemblies at the opposite ends 108 and 109 of the floor 91 are free to rotate about vertical axes while the pair of wheel assemblies that are located intermediate the opposite ends 108 and 109 are incapable of swiveling about such a vertical axis. This arrangement for the wheel assemblies provides a swivel or caster-type mounting arrangement for the wheel assemblies at the opposite ends 108 and 109 of the floor and a non-swivel mounting for the wheel assemblies that are located intermediate such opposite ends.

FIG. 11 illustrates the arrangement in the vicinity of the wheel assembly 110 that is located intermediate the opposite ends 108 and 109 and at the right side of the carrier floor 91. This wheel assembly 110 comprises a pair of metal wheels 111 and 112 which are rotatably mounted at the opposite ends 114 and 115 of an axle or a pin 113. This pin 113 establishes a horizontal axis for rotational movement of the wheels 111 and 112 and extends through the lower end portion 116 of a vertically oriented rectangular plate 118. The pin 113 is fixed to the plate 118 between its opposite ends 114 and 115 and as such the wheels 111 and 112 are located at the opposite sides of the plate 118, as seen in FIG. 12. At its upper end 117, the mounting plate 118 for the axle or pin 113 is welded to a horizontally arranged circular plate 119. The circular plate 119 is fixed to the underside of a pneumatically actuated piston 120 in this instance whereas in the wheel assemblies at the opposite ends of the carrier, the circular plate 119 is mounted on the piston 120 for rotational movement about a vertical axis.

The piston 120 shown in FIG. 11 is vertically movable in a downwardly opening rectangular box-like housing 121 which defines a chamber 122 for movement of the piston 120. The chamber 122 houses a pneumatically inflatable air-tight bag 123. The chamber forming housing 121 includes a rectangular top wall plate 124 that is horizontally arranged and underlies the top flanges 125 of the adjacent structural members 126 and 127 in the floor frame structure as seen in FIG. 11. In addition to the top wall plate 124, housing 121 includes four side wall plates that are collectively designated at 128. The piston 120 is in the form of a horizontally arranged rectangular metal plate with upturned edge flanges 129. These flanges bear against the side wall plates 128 and serve to maintain the generally horizontal orientation of the piston 120 during its movements. When the air-tight bag 123 is inflated with air, it thrusts the piston 120 downwardly against the lower flanges 130 of floor frame members 126 and 127 to extend the wheel assemblies 110 to the extended position 131 below the floor frame 100. Here the assembly is maintained until the bag is deflated. When deflation happens, the weight of the carrier causes the wheel assembly 110 to retract into the floor frame 100 and back to the retracted position 132 shown in solid lines.

Each of the wheel assemblies 107 has a piston chamber forming housing substantially like that seen in FIG. 11 and each wheel assembly is equipped with an inflatable bag that is connected in a pneumatic system which is designated at 134 in FIG. 10. System 134 includes an air conduit 135 that extends transversely at the rear end 109 of the floor and a pair of conduits 136 and 137 that are connected to the opposite ends of conduit 135 and extend forwardly thereof and along the opposite sides 138 and 139 of the floor.

Each of the air bags associated with the wheel assemblies 107 at the left side of the carrier is connected to conduit 136 whereas each of the air bags associated with the three wheel assemblies 107 at the right side of the carrier is connected to conduit 137. At the rear end of the floor 91, system 134 has a coupling 140 of the so-called "quick connect/disconnect" type that has a one way valve for connection with a suitably equipped and pressurized air hose that may be used in pressurizing the system and the bags connected therewith. Coupling 140 is conveniently located at the rear of the cargo carrier and is connected to the air line 135 by a connection conduit designated at 144. Line 135 has a pressure relief valve 141 that may be manually opened and closed at the rear of the carrier by manipulation of a handle designated at 142. By manipulating the handle 142 to close the valve 141 and by coupling a suitably pressurized air hose to coupling 140, the pneumatic system 134 may be pressurized to inflate the air bags 123 and, thus, to cause extension of the wheel assemblies 107. This will result in an elevation of the carrier to a supported position on its wheel assemblies. The pressurized air hose may then be removed from the coupling 140 without causing depressurization of the system 134 or deflation of the bags. Thereafter when depressurization of the system 134 and deflation of the air bags is desired, one merely has to manipulate handle 142 so as to open the relief valve 141.

The front end wall 92 of carrier 14 is arranged transversely at the front end 108 of floor 91. It includes an upright frame 147 that is covered at the exterior 98 of the carrier by a metal covering designated at 148 and at the interior 97 by a covering designated at 149. Except for a rectangular opening 150, insulation 151 is provided between the structural members 152 of frame 147 and the frame coverings 148 and 149 so as to minimize the transfer of heat through the walls. The opening 150, as best seen in FIG. 7, is provided for reception of the air circulation conduits of the refrigeration unit 17 mounted on the vehicle and as will be more fully explained subsequently.

The rear wall 93 of the carrier 14 is arranged transversely at the rear end 109 of the floor 91. It includes an upright frame 157 that is covered at the exterior 98 of the carrier by a metal covering 158 and at the interior 97 by a metal covering 159. The wall 93 has a large rectangular opening that serves as a doorway 160 for ingress and egress to and from the interior 97 of the carrier. Except for the doorway area, the frame is provided with suitable insulation 161 between the structural members 162 thereof and the frame coverings 158 and 159.

Figures 5, 6:
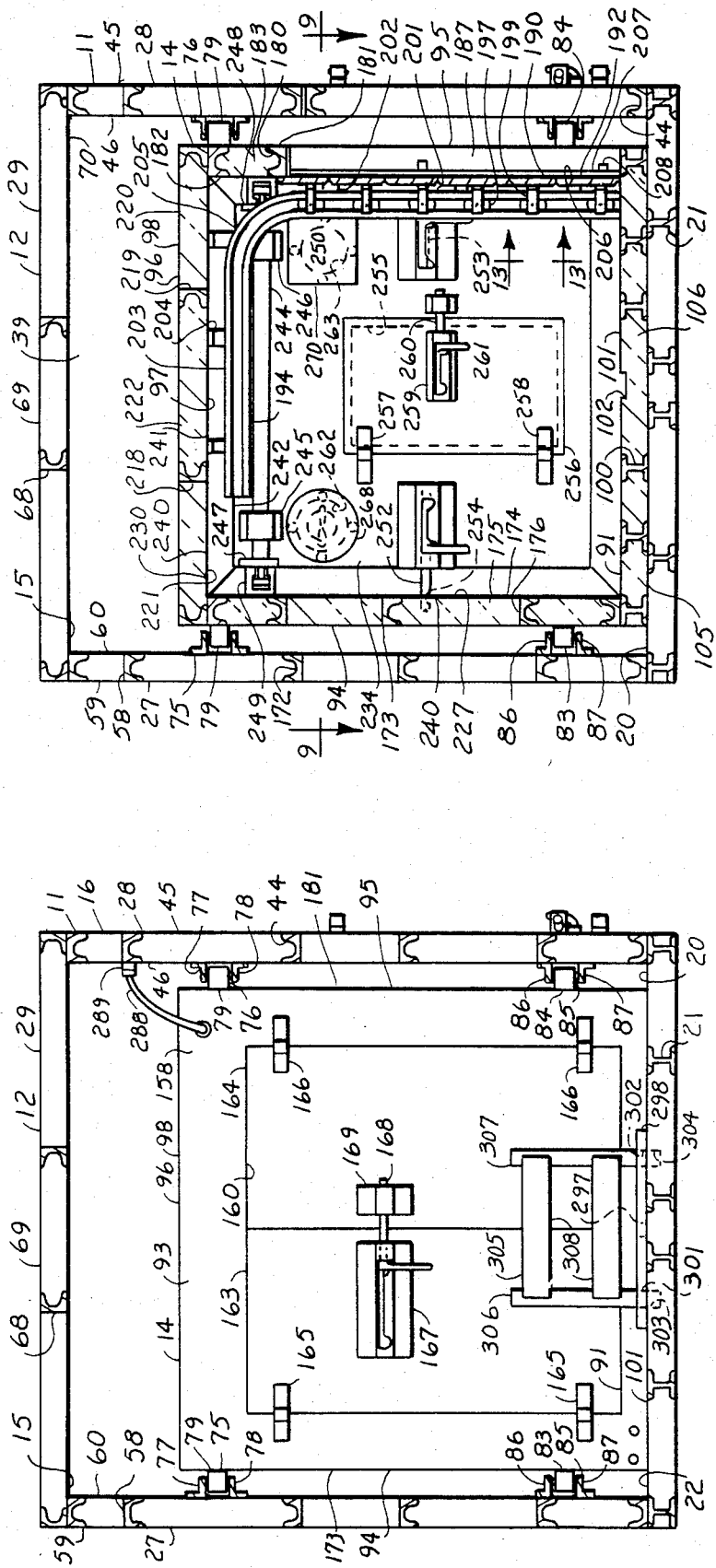
FIG. 5 is a generally transverse vertical section through the van body along the Lines 5—5 of FIG. 3.
FIG. 6 is a generally transverse vertical section through the van body and cargo carrier seen in FIG. 3 and as taken generally along the Lines 6—6 thereof.

As seen in FIG. 5, the doorway 160 in the end wall 93 is closed by a pair of doors 163 and 164 that are hinged to the end wall 93 for outward pivotal movement to open positions by a pair of hinges that are designated at 165 and 166 respectively. The doors 163 and 164 are maintained in their closed positions by a latch mechanism 167 that includes a horizontally slidable bolt 168 which is mounted on door 163 and a receiver 169 therefore which is mounted on door 164 and in working alignment with the bolt. Doors 163 and 164 are, of course, also insulated so as to minimize heat losses through the rear wall area of the cargo carrier.

The left side wall 94 extends longitudinally between the opposite end walls 92 and 93 and includes a wall frame 172 that is mounted upright at the left side 138 of the floor 91. The frame 72 is covered at the exterior by a covering 173 and at the interior side by a covering designated at 174. The wall 94 is insulated to minimize heat transfer by means of suitable insulating material 175 which is located between the coverings 173 and 174 and between the structural components 176 of the wall frame 172.

The right side wall 95 also extends longitudinally of the carrier and between the opposite end walls 92 and 93. It includes a wall frame 180 that is mounted upright at the right side 139 of the floor 91. Frame 180 is covered at the exterior 98 with a metal covering 181 and at the interior 97 with a covering 182. The wall 95 is insulated by means of suitable insulation 183 and which is located between the coverings 181 and 182 and between the structural components 184 of the wall frame 180.

Right side wall 95 of carrier 14 has a plurality of lateral openings that serve as doorways 186, 187 and 188. These openings are horizontally spaced apart and communicate with the interior 97 of the carrier, and each doorway is shaped and arranged for the passage of cargo between the interior 97 and the exterior 98 of the carrier. The carrier 14 is also provided with a plurality of doors 189, 190 and 191 for closing the respective doorways 186, 187 and 188. These doors are mounted for movements to open positions in the interior 97 of the cargo carrier and which are proximate to the roof 96 thereof.

The structure of the side wall doors 189, 190 and 191 and the means for mounting them in the carrier structure is illustrated by reference to the center door 190 and to the structure depicted primarily in FIGS. 2, 3, 6 and 13. This door 190 is made up of a plurality of elongated, flat, rectangular panels 192 that may be made of suitable insulation material. The panels are oriented longitudinally and located in the interior of the carrier between a pair of tracks that are designated at 193 and 194 and associated with the door 190. The door panels 192 are arranged in edge-to-edge relation and each panel is connected to each panel adjacent thereto by a pair of hinges designated at 195 and 196. (FIG. 13) Each panel is also equipped with a pair of rollers 197 and 198 that are mounted on suitable brackets 199 and 200 which are in turn secured to the opposite ends of the panel. The rollers 197 and 198 are contained in the respective tracks 193 and 194 and provide the means by which the door panel is movably mounted in the door structure.

Each of the tracks 193 and 194 has a vertical section 201 that is offset from the interior side of the right wall 95 and mounted thereon by suitable brackets 202 for supporting the door panels in the proximity of the side wall 95 when the door is closed. Each of the tracks also has a horizontal section 203 that is offset from and suspended from the roof structure 100 by suitable brackets 204. These track sections 201 and 203 are interconnected in each track structure by an arcuate section that is designated at 205.

When the door is closed, the door panels are suspended between the vertical track sections 201 of the tracks 193 and 194. In this closed position, the door panels 192 confront an elongated seal 207 which surrounds the doorway 187 and which serves to minimize heat transfer through the doorway 187 by convection. To open the doorway 187, the handle 208 of door 190 is simply raised. This moves the panels and shifts the weight thereof onto the horizontal track sections 203 that extend transversely of the carrier in the proximity of the roof. Suitable means (not shown) may be used to counterbalance the weight of the panels so as to aid in opening the doors and maintaining them at their open positions until such time as the need arises to close them. Such counterbalancing means are well known in the art and form no part of the invention.

The roof 96 of the carrier 14 is arranged horizontally and is fixed to the upright end walls 92 and 93 and to the side walls 94 and 95 of the carrier. It includes a roof frame 218 that is made up of structural members 219. The roof frame 218 is covered at the exterior and interior of the carrier by suitable coverings designated at 220 and 221 respectively. Between the coverings 220 and 221 and the structural members 219, the roof is provided with suitable insulation 222 to minimize the transfer of heat between the interior and exterior of the cargo carrier.

The interior 97 of the cargo carrier 14 is divided into a plurality of compartments which are spaced apart between the opposite end walls 92 and 93 and which are designated at 226, 227 and 228. Each compartment extends transversely of the carrier and between the opposite side walls 94 and 95. In the spaces between the center compartment 227 and the opposite end compartments 226 and 228, the carrier 14 is provided with a pair of upright panels 229 and 230. These panels extend transversely of the carrier and are longitudinally adjustably movable in the carrier so as to provide a capability for varying the compartment sizes. The front compartment 228 is defined by the front panel 230 and the front end wall 92 of the carrier and is accessible from the exterior 98 of the carrier through the front doorway 188 in the right side wall 95. The rear compartment 226 is defined by the rear panel 229 and the rear end wall 93 of the carrier, and is accessible from the exterior of the carrier through the rear doorway 186 in the right side wall 95. This compartment 226 is also accessible through the doorway 160 in the rear end wall although access is normally prevented when the carrier is retained in its operating position in the van body by a retainer component as will be evident subsequently. The center cargo compartment 227 is defined, on the other hand, by the front and rear panels 230 and 229 and is accessible from the exterior of the carrier 14 through the center doorway 187 in the right side wall 95.

Figure 4:
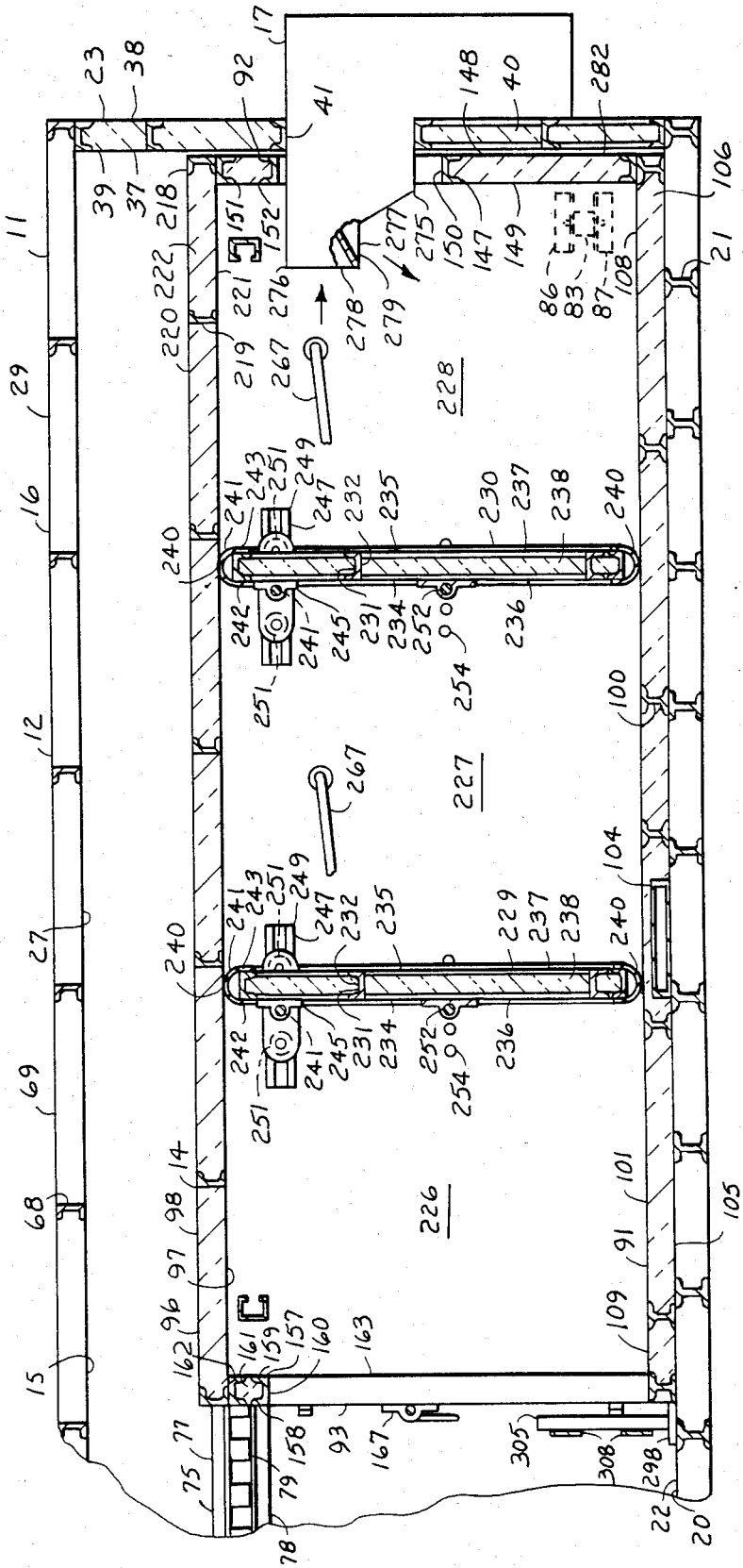
FIG. 4 is a generally longitudinal vertical section through the fragment of the van body and cargo carrier seen in FIG. 3 and as taken generally along the Lines 4—4 thereof, certain parts being removed.

The structure of the panels 229 and 230 is best seen by reference to FIGS. 4 and 6. Each panel includes a generally rectangular frame 231 which is composed of structural members 232 that are suitably fixed together. At the opposite side faces 234 and 235 of the panels, the frame 231 has suitable metal coverings 236 and 237, and between these side face coverings 236 and 237 and the structural members 232, the panel is insulated by suitable insulation material designated at 238.

Each panel is suspended from the opposite side walls 94 and 95 of the carrier on a pair of tracks which are designated at 249 and 250. As thus suspended, each panel is longitudinally movable in the space 239 between the adjacent tracks for suspending the side wall doors associated with the compartments at the opposite side faces of the panel. To minimize convection along the edges 240 of the panel, each of the four edges of the panel is equipped with an elongated arcuate element that is made of resilient material and forms a seal along the edge. As seen by reference to the elongated seals 241 along the upper edges of the panel frames in FIGS. 4 and 6, these edge seal sections are secured along their side edges 242 and 243 to the opposite side faces 234 and 235 of the panel.

At the rear side face of the panel, each panel is equipped with an elongated rod 244 that extends transversely of the carrier near the top of the panel. This rod 244 is journaled in a pair of brackets 245 and 246 that are transversely spaced apart and mounted at the top of the panel, as seen in FIG. 6. At its opposite ends, the rod 244 is fixed to a pair of carriage plates 247 and 248 that are movably mounted on a pair of tracks 249 and 250 that are mounted on the opposite side walls 94 and 95 of the cargo carrier 14. Each carriage plate is provided with a pair of rollers 251 that are supported and horizontally movable on the track associated with the carriage plate. With this arrangement, each of the panels 229 and 230 is suspended from the opposite side walls 94 and 95 and is longitudinally movable in the space 239 (FIG. 3) that lies between the adjacent horizontal track sections respectively associated with the adjacent doors in the right side wall 95 of the carrier.

Intermediate the top and bottom extremities of the panel, each panel is provided with a pair of slide bolts 252 and 253 which are adapted to fit into aligned wall sockets 254 that are located in each of the opposite side walls 94 and 95. By moving a panel longitudinally of the carrier 14 to a position at which the slide bolts 252 and 253 may be inserted in selected wall sockets that are located in the opposite side walls and arranged in transverse alignment, the panel may be secured against further longitudinal movement in the interior of the carrier by simply inserting the slide bolts 252 and 253 in the aligned wall sockets. This capability of adjustably moving the panels enables one to increase or decrease the sizes of the compartments at the opposite side faces 34 and 35 of the panel. By withdrawing the slide bolts 252 and 253 from the aligned wall sockets, the panels may again be moved on the tracks 249 and 250 and the bolts again inserted in another pair of transversely aligned sockets to relocate the panel and again secure it at a new position.

Each panel has a rectangular doorway 255 (FIG. 6) with a rectangular door 256 that is insulated and hinged at the rear side face 234 of the panel by a pair of hinges 257 and 258 for pivotal movement toward the rear of the carrier about a vertical axis. The door 256 is normally secured in its closed position by a latch mechanism 259 that includes a slide bolt 260 that is mounted on the door and a receiver 261 therefore that is mounted on the panel adjacent the door, as seen in FIG. 6.

In addition to the opening that provides the doorway 255 between the opposite side faces of each panel, each panel is provided with a pair of circular openings 262 and 263 that are located near the opposite lateral side edges of the panel. Each of these openings 262 and 263 communicates with the compartments at the opposite side faces 234 and 235 of the panel. In the opening 262 which is most remote from the doorways in the right side wall 95, the panel is equipped with a fan 264 that is mounted on and powered by an electric motor 265. This motor is connected by an electrical conduit 267 to an electrical outlet 266 that is located on the left side wall 94 and in the compartment at the front side face 235 as seen in FIGS. 3 and 4. The arrangement is such that the fan 264 during its operation, withdraws air from the compartment at the front side face 235 of the panel and discharges it into the compartment at the rear side face 234 thereof. Here, the panel is equipped with a circular air deflection plate 268 that is offset from the rear side face 234 and mounted in the path of the fan discharge by means of wall brackets designated at 269. The other opening 263 is provided to facilitate the return of air from the compartment at the rear side face 234 of the panel to the compartment at the front side face 235 under the influence of the fan 264 during its operation. At the rear side face 234, each panel is also equipped with another air deflection plate 270 which in this instance is square in configuration. Here, the plate 270 is offset from the rear side face 234 of the panel and is aligned with the opening 263 by means of wall brackets designated at 271. These deflection plates 270 simply facilitate distribution of the circulation of the circulating air and prevent channeling.

The refrigeration unit 17 is permanently mounted at the exterior 16 of the van body and on the front end wall 23 thereof. The unit 17 illustrated is a conventional refrigeration unit that is found in the marketplace and which is provided with a circulation system 275 for circulating the air to be conditioned in heat exchange relation with the refrigerant or coolant thereof. This circulating system 275 includes an intake conduit 276 for receiving the air to be conditioned and a discharge conduit 277 for returning the air after its conditioning. As seen in FIG. 4, these intake and discharge conduits 276 and 277 communicate with the interior 15 of the van body 12 through the front end wall 23 thereof. As seen therein, the conduits 276 and 277 are located spacedly above the van body floor 20 and pass through the rectangular opening 41 in the front wall 23. In the operation of unit 17, air to be conditioned is withdrawn from the interior of the van body through the intake port 278 of the intake conduit 276 and after being reduced in temperature is returned via the discharge conduit 277 and discharged back into the van body interior 15 through the discharge port 279 of conduit 277. It will be understood that the refrigeration unit 17 is self contained and that although permanently mounted on the van body it is primarily used in the transit system 10 for refrigerating food products that are contained in the interior 97 of the cargo carrier 14 when the latter is located in its operating position in the van body.

It should be pointed out that the shape and arrangement of the cargo carrier 14 is such as to permit its insertion into and withdrawal from the interior 15 of the van body 12 through the opening that forms the entranceway 32 in the rear end wall 24 of the van body. Furthermore, the carrier is so shaped that when it is inserted in the interior 15 of the van body 12, the opposite end walls 92 and 93 extend transversely and are spaced apart longitudinally of the van body 12 while the opposite side walls 94 and 95 are spaced apart transversely of the van body and respectively located in close proximity to the interior sides of the opposite side walls 27 and 28. When the cargo carrier 14 is placed in its operative position 282 in the interior of the van body 12 and for the refrigeration of the contents of the carrier, the front end wall 92 of the carrier assumes a position in close proximity to the front end wall of the van body. As such, in this position 282, the air intake and discharge conduits 276 and 277 of the circulating system 275 are received in the rectangular opening 150 in the carrier front wall 92 and the air intake and discharge ports 278 and 279 are located in the front compartment 228 as is seen in FIG. 4.

The length of the cargo carrier 14, as seen in FIG. 1, is substantially less than the longitudinal dimension of the van body interior 15. As such, the rear end wall of the carrier 14 is forwardly offset from the rear wall 24 of the van body 12 when the carrier is located in its operative refrigeration position 282. Because of this, a storage compartment 283 is defined in the interior of the van body 12 by the rear end walls 24 and 93. This compartment 283, being at the exterior 98 of the cargo carrier and yet in the interior 15 of the van body, is accessible from the exterior 16 of the van body 12 through the entranceway 32 in the rear end wall 24 of the van body 12.

The arrangement of the lateral openings that form the doorways 186, 187 and 188 in the right side wall 95 of the carrier 14 is important. These openings 186, 187 and 188 are horizontally aligned with the respective lateral openings that form the entranceways 53, 52 and 51 in the right side wall 28 of the van body 12 when the carrier 14 is located at its operative position 282 for the refrigeration of its contents. Because of this, access to each of the compartments, 226, 227 and 228 of the cargo carrier 14 may be gained individually and through the right side wall 28 of the van body. Thus, access to the front compartment 228 may be realized through the aligned openings 48 and 188 in walls 28 and 95 while access to the middle compartment 227 may be realized through the aligned openings 49 and 187. Similarly, access to the rear compartment 226 of the carrier may be realized through the aligned openings 50 and 186 in the van body and carrier side walls 28 and 95 respectively.

The front end wall 92 of cargo carrier 14 is provided with an elongated, resiliently deformable element 284 that is secured to the exterior side of the carrier wall 92 in a manner such that it surrounds the rectangular opening 150 for the air circulation conduits 276 and 277. As seen in FIG. 8, this element 284 has an enlarged portion 285 which is deformed through contact with the front end wall of the van body 12 when the carrier is located in its operative refrigeration position 282. As thus located, this elongated element 284 serves as a seal that minimizes heat losses by convection through the carrier wall opening 115 and in the region surrounding the conduits 276 and 277 received therein.

When the refrigeration unit 17 is operating and the cargo carrier 14 is in its operative position 282 in the van body, all of the air in the interior 97 of the carrier 14 which is subjected to conditioning in the refrigeration unit 17 is being withdrawn from the front compartment 228 through the intake conduit 276 and returned to the compartment via the discharge conduit 277. The other two compartments 226 and 227 are cooled by the direct or indirect withdrawal of the air from the front compartment 228. Thus, through the operation of the fan 264 on the front panel 230, cold air is withdrawn from the front compartment 228 and discharged into the center compartment 227 while the air in the center compartment 227 is simultaneously being recirculated to the front compartment 228 through the return opening 263 in the wall panel 230. Similarly, through the operation of the fan 264 on the rear panel 229, cold air in the middle or center compartment 227 is withdrawn and discharged into the rear compartment 226 while simultaneously the air in the rear compartment is being recirculated to the middle compartment 227 through the return opening 263 in panel 229.

It will be seen from the above, that the front compartment 228 is the freezer compartment for the Category 1 food products that are stored. The middle compartment 227, on the other hand, will be maintained at a higher temperature than that in the freezer compartment through the operation of the fan 264 on panel 230 and is preferably maintained in the 32°–45° F. range so as to provide a storage area for the Category 2 food products. Again the rear compartment 226 will be maintained in a temperature range higher than that in the center compartment 227 because its air source for cooling relies on the temperature range maintained in the center compartment 227. Preferably the fan 264 on panel 229 is operated to provide a temperature range in the 45°–55° F. range in the rear compartment 226 so as to accommodate the Category 3 type food products therein. The Category 4 food products are, of course, stored in the compartment 283 provided between the rear walls 24 and 93 of the van body and cargo carrier.

The wall outlets 266 for the panel fan motors 265 are electrically connected to an electric conduit 288 that is located in the rear end wall 93 of the carrier 14 (FIG. 5). The van body 12 is provided with an electrical supply at an interior outlet 289 that is mounted on the van body right wall 28 and located in the proximity of the carrier rear wall 93 when the carrier assumes its operating position 282.

The electrical conduit 288 of the cargo carrier is connected to the electric outlet 289 in the van body 12 when the carrier is placed in its operative position 282. This connection permits the fans 264 on the wall panels 229 and 230 to be energized. The operation of each fan motor 265 is controlled by a thermostat (not shown) which is mounted on the front side of the panel on which the fan motor is mounted. The thermostat is designed to open the circuit energizing the fan motor when the temperature sensed in the compartment from which the air is withdrawn exceeds a temperature that is determined by the setting of the thermostat.

To facilitate a determination of the temperatures in the three compartments 226, 227 and 228 of the cargo carrier 14 from the exterior 16 of the van body 12, temperature gauges 290, 291 and 292 are mounted on a panel on the left side of the carrier 14 and in a position at which they are viewable through the opening 61 in the left side wall 27 of the van body (FIG. 12). Here the carrier is also provided with a pair of lights 293 and 294 which are energized when the respective fan motors on the rear and front wall panels 229 and 230 are operating. Each light is de-energized when the fan motor with which it is associated is de-energized. Gauges 290, 291 and 292 are controlled by sensors (not shown) located in the cargo carrier compartments 226, 227 and 228 respectively.

To derive the greatest benefits from the transport system 10 depicted herein, it is considered most economical to utilize two cargo carriers in conjunction with each land vehicle that is equipped with a van body 12 and refrigeration unit 17 embodying the aspects of the invention. In this way, one cargo carrier may be in the process of being loaded with food products while the other cargo carrier is on board the land vehicle and being used in the transportation of food products to retailers along a delivery route.

In practice, the loading of cargo carriers is done at a cold storage food product warehousing facility. To illustrate the use of the cargo carrier and land vehicle components of a transport system embodying the principles of the invention, it will be first assumed that all three compartments 226, 227 and 228 of the cargo carrier 14 have been filled with food products contemplated for distribution along a delivery route. Under such circumstances, the Category 1 food products are contained in the front compartment 228, the Category 2 food products are contained in the center compartment 227, the Category 3 food products are contained in the rear compartment 226, and the cargo carrier 14 is located in the cold storage warehousing facility so that the surrounding low temperature environment serves to maintain the quality of the food products contained in the carrier compartments.

In filling the compartments, the normal practice is to move the carrier about the cold storage facility in which the foods are warehoused. As such, the carrier is mobile and capable of being moved about the warehousing facility and the pressure relief valve 141 is closed with the pneumatic system 134 being pressurized so that all of the air bags 123 for the wheel assemblies 107 of the loaded carrier are fully inflated. Under such circumstances, the pistons 120 have theretofore been pneumatically actuated to extend the wheel assemblies 107 to their extended positions 131 and the wheel assemblies 107 are being maintained in these extended positions for purposes of facilitating the carriers wheeled movement about the warehousing area.

The carrier 14 is moved about the cold storage facility and into and out of the van body 12 of the vehicle 11 by a prime mover, such as a tractor, that is equipped with a draw or push bar. In connecting the prime mover to the carrier 14, the draw or push bar is pivotally connected to the carrier 14 by a pin (not shown) which extends through a vertical hole 297 in the center of a horizontal flat plate 298 that is fixed to the rear end 109 of the floor frame 100. With the bar attached, the prime mover is used to push the carrier 14 through the entranceway 32 in the rear wall 24 of the vehicle van body. As the front end of the carrier 14 moves into the interior 15 of the van body 12, the opposite side walls 94 and 95 of the carrier 14 come into contact with the rollers 79 of the roller assemblies 75 and 76 that are mounted on the opposite side walls 27 and 28. These assemblies 75 and 76 serve to guide the movement of the carrier 14 into its operative position 282 in the van body as the carrier is being pushed into position by the tractor. Once the carrier has reached the operative position 282, the roller assemblies 75 and 76 through contact with the walls 94 and 95 of the carrier, secure the upper part of the carrier against substantial lateral movements relative to the van body.

As the carrier is moved into its operative position 282, the two rollers 83 and 84 on the opposite side walls 27 and 28 come into contact with the opposite side walls 94 and 95 of the carrier 14. These rollers 83 and 84 also serve to guide the movements of the carrier into its operative position 282. As seen in FIG. 7, there is little tolerance in the rectangular opening 150 in the front wall 92 of the carrier 14 for lateral movement of the carrier relative to the conduits 276 and 277 of unit 17 as these components of the refrigeration unit are being received in the opening 150. Rollers 83 and 84 and roller assemblies 75 and 76 serve to align the opening 150 in the front wall 92 of carrier 14 with the conduit components 276 and 277 of the refrigeration unit 17 as the carrier arrives at its operative position 282. In addition and through contact with the side walls 94 and 95 when the carrier has reached the operative position 282, the rollers 83 and 84 and the rollers of the roller assemblies 75 and 76 secure the front end of the carrier 14 against substantial lateral movement relative to the van body and to the components of the refrigeration unit that are received in the opening 150 in the front wall thereof.

When the carrier is moved into the operative position 282 at which the intake and discharge conduits 276 and 277 are received in the front wall opening 150, the carrier 14 as supported on its wheel assemblies 107 is at an elevated position 299 (FIG. 7). As such, the opening 150 in the front end wall 93 of the carrier is arranged to accommodate the relative movements of the carrier and van body as the wheel assemblies 107 are extended and retracted into the floor frame 100 while the carrier is at the operative position 282. The position of the rectangular opening 150 relative to the refrigeration unit 17 when the carrier wheels are extended is illustrated by the broken line position 300 (FIG. 7) whereas the position when the carrier wheels are retracted is shown in solid lines.

As the carrier 14 moves into its operating position 282, the enlarged portion 285 of the elongated seal member 284 is compressed between the front walls 92 and 23 of the carrier 14 and van body 12. Simultaneously, a pair of holes 301 and 302 at the opposite ends of the flat plate 298 become aligned with a pair of sockets 303 and 304 in the floor 20 of the van body. At this point in the process of loading the carrier 14 in the van body 12, a metal retainer 305 for securing the carrier 14 against longitudinal movements in the van body 14 is used. The retainer 305, as best seen FIGS. 2, 3 and 5, has a pair of elongated upright pin-type elements 306 and 307 that are fixed in spaced relation by a pair of metal plates 308 that are welded thereto. The retainer 305 is oriented so that the lower ends of the retainer pins 306 and 307 extend through the respective holes 301 and 302 in the metal plate 298 of the carrier and are received in the respective floor sockets 303 and 304. Once this has been done, and the prime mover disconnected from the carrier 14, the handle 142 is manipulated to open the pressure relief valve 141. Thereafter as the air pressure in the system 34 is relieved, the weight of the carrier 14 forces the wheel assemblies 107 to retract into the chambers 122 (FIG. 11) and the floor frame 100 comes to rest on the floor 20 of the van body 12. Any slight misalignment of the holes 301 and 302 in the draw bar plate 298 with the floor sockets 303 and 304 is corrected as the carrier plate 298 moves downwardly on the pins 306 and 307 of the retainer during retraction of the wheel assemblies 107. Where proper alignment occurs initially, the retainer 305 may, of course, be inserted in the holes and sockets after the carrier frame has come to rest on the floor of the van body as will be evident to those skilled in the art. The retainer 305 in addition to securing the carrier against longitudinal movement also secures the rear end of the carrier 14 against substantial lateral movement relative to the van body and in this respect cooperates with the roller assemblies 75 and 76 in providing such security.

Once the floor frame 100 has come to rest on the van body floor 20, the electrical conduit 288 at the rear of the carrier 14 is connected to the electrical socket 289 in the van body 12. This connects the electrical system of the carrier 288 to that of vehicle 11 and should energize the fan motors 265 in the interior panels 229 and 230 of the carrier. To check and ascertain if the fan are operational, one has only to open the viewing door 62 (FIG. 12) on the left side of the van body and observe whether or not the indicator lights 293 and 294 are operational. Simultaneously, one can check on the temperature conditions in each compartment by simply observation of the readings of the gauges 290, 291 and 292 that are visible through the openings 61 at this point in the van body structure.

The refrigeration unit 17 is, of course, operated and controlled from the exterior 16 of the van body in a conventional manner and may be placed in operation either before or after insertion of the carrier 14 into its operative position 282. Furthermore, during use, its cooling capacity may be increased or decreased as deemed warranted by the temperature conditions reflected by the guages 290, 291 and 292.

With the carrier in its operative position 282, the compartment 283 between the rear walls 24 and 93 of the van body and carrier is next filled with the category food products and the rear van body doors 33 and 34 are closed.

It should be pointed out that when the carrier 14 is located in its operative position 282 in the van body 12, the arrangement is such that the lateral openings or doors 186, 187 and 188 in the carrier are located in working alignment with the respective lateral openings or entranceways 50, 49 and 48 in the van body. As such, and by virtue of this arrangement, one may selectively gain access to each compartment in the carrier 14 and to the category of food products contained therein with ease and by simply opening the van body door which confronts that door which is then closing the lateral doorway to the selected compartment and thereafter opening the confronting door so as to gain access to the selected compartment. As for the Category 4 food products which don't require refrigeration, such food products are obtained by access to compartment 283 through the opening or entranceway 32 in the rear wall 24 of the van body.

The arrangement greatly facilitates the delivery of all four categories of food products to retailers as will be evident to those familiar with current food product distribution systems. As such, when food products are being delivered along a delivery route, any fluids that are derived from condensation, broken containers or spillage in the interior of the carrier, finds its way to the U-shaped recess 102 in the floor 91 and via the drain 103 to the storage tank 104.

Upon completion of the delivery route and return of the land vehicle 11 to the cold storage warehousing facility, the compartment 283 in the van body is first emptied and the retainer 305 removed from the floor sockets 303 and 304 and the connection with the carrier. At this time, the electrical conduit 288 at the rear of the carrier is also disconnected from the van body outlet 289. Thereupon, and after making sure the pressure relief valve 141 is closed, an air hose (not shown) that is connected to a suitable pressurized source of air is connected to coupling 140 and the pneumatic system 134 is pressurized to inflate the air bags 123. This causes extension of the wheel assemblies 107 to their extended positions and elevates the carrier to a wheel supported position in the van body. Once the system 134 is sufficiently pressurized and the air hose is disconnected, the tractor may be connected to the draw plate 298 and the carrier drawn from the interior 15 to the exterior 16 of the van body through the entranceway 32 in the rear wall 26. Ideally, when this has been done, another carrier which has been previously filled with the refrigerated food products required on the next delivery route traversed by the vehicle, is immediately loaded into the van body 12 together with a new load of Category 4 food products so that delays in use of the land vehicle are minimized.

After the carrier 14 is removed from the vehicle 11, the residual contents of the compartments may be removed, the interior 97 cleaned, and the fluid contents of the tank 104 drained to a suitable sewer facility. Thereafter, the carrier may be again loaded with the food products required for its next use on the delivery route.

From the foregoing it is evident that several economies are realized through use of the transport system. For one, the amount of turnaround time required for the land vehicle is minimized. Secondly, the need for an expensive totally insulated van body structure for hauling more than one of the four categories of food products is unnecessary. The need for refrigerating food products unnecessarily and/or at temperatures below those needed for adequate preservation as often transpires when the various food product categories are being transported in a single van body structure, is avoided. The transport system also enables the uninsulated van body vehicle to be used for handling non-refrigerated cargo when the need for hauling a full truckload quantity of the Category four food products is desired and all without tying up an expensively insulated van body structure for hauling such Category 4 food products.

Apart from the above, the transport system enables the economic delivery of all four categories of food products to small retailers so that the latter can realize the savings associated with mass purchasing power. This is particularly so when the distribution system is owned by a cooperative association of retailers. In effect, the transport system advocated, enables more of the cooperative mass purchasing power price breaks to be realized by small retail members of the cooperative than such members would otherwise realize if they had to buy certain categories of food products from more expensive local suppliers because of the inability to economically handle and deliver such food products to the small retailers.

While only a certain preferred embodiment of this invention has been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. A food product transport system comprising: a land vehicle that includes an elongated van body having a floor with opposite ends that include a front end and a rear end, an upright rear end wall that extends transversely of the van body and is mounted at the rear end of said floor and provided with an entranceway to the interior of the van body, and an upright side wall that extends between said opposite ends, an elongated insulated cargo carrier located in the interior of said van body and being shaped and arranged for withdrawal therefrom through said entranceway thereto, said carrier having opposite end walls that are spaced apart longitudinally of the van body and extend transversely thereof, opposite side walls that are spaced apart transversely of the van body and extend between said opposite end walls of the carrier, a plurality of compartments that extend transversely of the carrier between said opposite walls and are longitudinally spaced apart in the interior of the carrier between said opposite end walls, an upright wall panel located in the space between a pair of said compartments, said panel extending transversely of the carrier and between the opposite side walls thereof, and means for circulating air between said pair of compartments including an electric fan that is mounted on said panel, means mounted on the vehicle at the exterior of said van body for refrigerating food products located in one of said pair of compartments, one of said opposite side walls of said carrier having a pair of doorways that are horizontally spaced apart and communicate with the respective compartments of said pair thereof, each of said doorways being adapted and arranged for the passage of cargo between the interior and exterior of said carrier, said one of said opposite side walls being proximate to the interior side of said upright side wall, said upright side wall having a pair of entranceways to the interior of said van body and which are arranged in horizontal working alignment with the respective doorways in said one of said opposite side walls of said carrier so that access to the respective compartments of said pair thereof may be gained through said upright side wall of said van body.

2. A food product transport system in accord with claim 1 wherein said carrier has a floor frame, a plurality of wheel assemblies that are mounted on and retracted into said floor frame, and pneumatically actuated means for extending said wheel assemblies to and maintaining them at a position below said floor frame, thereby to facilitate wheeled movement of said carrier into and out of said van body through said entranceway in said upright end wall thereof, and said van body has a pair of opposite side walls that include said upright side wall, a pair of roller assemblies that are mounted in the interior and on the respective opposite side walls of said van body for guiding wheeled movement of said carrier into and out of said van body, each of said roller assemblies being elongated and extending longitudinally of said van body and being in contact with one of the opposite side walls of said carrier, and a pair of rollers that are located at the front end of said van body floor and mounted in the interior and on the respective opposite side walls of said van body for guiding wheeled movement of said carrier at said front end and thereat securing said carrier against substantial lateral movement relative to said van body when said wheel assemblies are retracted.

3. A food product transport system in accord with claim 1 wherein said van body has an upright front end wall that extends transversely of said van body and is mounted at the front end of said floor, one of said opposite end walls of said carrier is located in the proximity of said front end wall of said van body, and the other of the opposite end walls of said carrier is offset from said rear end wall of said van body, thereby to define a storage compartment in the van body which is accessible from the exterior of the van body through the entranceway in said rear end wall thereof.

4. A food product transport system in accord with claim 1 wherein said van body has an upright front end wall that extends transversely of the van body and is mounted at said front end of said floor, said refrigerating means has an air circulating system for passing air in heat interchange relation with a coolant and which includes conduit means communicating spacedly above said floor through said upright front end wall with the interior of said van body, said conduit means having air intake and discharge ports, one of said opposite end walls of said carrier is located in the proximity of said front end wall of said van body and has an opening in which said conduit means is received, said one of said pair of compartments is defined by said one of said opposite end walls of said carrier and said upright wall panel, said air intake and discharge ports being located in said one of said pair of compartments.

5. A food product transport system in accord with claim 1 wherein said upright wall panel is longitudinally movable in the interior of the carrier so as to adjust the sizes of the pair of compartments spaced thereby.

6. A food product transport system in accord with claim 1 wherein said carrier has a roof frame, and a pair of doors closing the respective doorways of said carrier, each of said pair of doors having a plurality of door panels that are associated with and movably mounted on a pair of tracks which have respective horizontally arranged and spaced apart track sections that extend transversely of said carrier and are suspended from and located in the proximity of said roof frame, said horizontally arranged track sections being provided to support the door panels associated therewith when the door is moved to its open position.

7. A food product transport system in accord with claim 6 wherein said van body has door means closing said entranceway in said upright rear end wall thereof, and a pair of doors closing the respective entranceways in said upright side wall thereof, each of said doors of said pair of doors of said van body being hinged to said upright side wall and pivotally movable outwardly of said van body in opening the entranceway closed thereby.

8. A food product transport system in accord with claim 1 wherein said carrier has a floor frame, a plurality of wheel assemblies that are mounted on and retracted into said floor frame, and pneumatically actuated means for extending said wheel assemblies to and maintaining said wheel assemblies at a position below said floor frame, thereby to facilitate wheeled movement of said carrier into and out of said van body through said entranceway in said upright end wall thereof, said van body has an upright front end wall that extends transversely of said van body and is mounted at the front end of said floor, one of said opposite end walls of said carrier is located in the proximity of said front end wall of said van body, the other of said opposite end walls of said carrier is offset from said rear end wall of said van body, thereby to define a storage compartment in said van body which is accessible from the exterior of said van body through said entranceway in said rear end wall thereof, and said van body has door means closing said entranceway in said upright rear end wall thereof.

9. A food product transport system in accord with claim 8 wherein said refrigerating means has an air conditioning system for passing air in heat interchange relation with a coolant and which includes conduit means communicating spacedly above said floor through said upright front end wall with the interior of said van body, said conduit means having air intake and discharge ports, said one of said opposite end walls of said carrier has an opening in which said conduit means is received, said one of said pair of compartments is defined by said upright wall panel and said one of said opposite end walls of said carrier, said air intake and discharge ports being located in said one of said pair of compartments.

10. A food product transport system in accord with claim 9 wherein said carrier has a roof frame, and a pair of doors closing the respective doorways of said carrier, each of said pair of doors having a plurality of door panels that are associated with and movably mounted on and located between a pair of tracks that are spaced apart from the pair of tracks associated with the door panels of the other door of said pair of doors, each of said tracks having a horizontally arranged track section that extends transversely of said carrier and is suspended from and located in the proximity of said roof frame, the horizontally arranged track sections of the pair of tracks associated with the door panels of each door being provided to support the associated door panels in the proximity of said roof frame when the door is moved to its open position, said upright wall panel is movable longitudinally of the carrier in the space between the tracks associated with the respective doors of said pair of doors, and said van body has a pair of doors closing the respective entranceways in said upright side wall thereof, each of said doors of said pair of doors of said van body being hinged to said upper side wall and pivotally movable outwardly of said van body in opening the entranceway closed thereby.

11. A food product transport system in accord with claim 5 wherein said opposite side walls have a pair of longitudinally arranged tracks, said upright wall panel has roller means located in the respective tracks and is suspended from and located between said pair of tracks, and means carried by said upright wall panel and releasably engagable with said opposite side walls for securing said panel against such longitudinal movement in the carrier.

* * * * *